Patented June 5, 1951

2,555,902

UNITED STATES PATENT OFFICE 2,555,902

PREPARATION OF BAKING MIXES

Paul W. Salo and Louis J. Huber, Minneapolis, Minn., assignors to General Mills, Inc., a corporation of Delaware No Drawing. Application November 2, 1946, Serial No. 707,533

5 Claims. (Cl. 99—92)

The present invention relates to prepared baking mixes of the type which necessitate the mere addition of liquid to change them to the proper condition for baking.

Prepared baking mixes include mixes for cake, gingerbread, muffins, such as corn muffins, bran muffins, etc., biscuits, pie crust mixes, and the like. All of these mixes contain a substantial quantity of shortening as an essential ingredient. The incorporation of shortening into these mixes has always presented a problem. Hard shortenings which have been found desirable in many respects from the baking standpoint, are difficult to distribute uniformly throughout the mix. Softer shortenings which are more readily distributed through the mix, give the mix a greasy appearance and impair the baking properties of the mix. In the past, shortening has been added to these mixes by merely introducing lumps or blocks of shortening into the dry ingredients and then agitating the mixture until the shortening is thoroughly distributed. This method results in overworking of the mix in many respects. Thus the small particles of shortening are too thoroughly mixed with the dry ingredients and give it a greasy, lumpy appearance while the larger particles of shortening are insufficiently distributed. This is particularly important in the case of mixes such as pie crust in which the mixing time is quite critical. In such mixes there is a maximum mixing time which may be employed without affecting the baking properties. By employing the heretofore described methods, it is extremely difficult to obtain a mix of optimum baking properties. These inadequacies in the incorporation of shortening have had adverse effects on the baking properties.

We have found that by introducing into the prepared mix uniformly sized shortening particles, that these may be readily and intimately incorporated into the mix without overworking the mix or adversely affecting its baking properties.

It is, therefore, an object of the present invention to provide a process of preparing baking mixes in which the shortening is incorporated in the form of relatively uniform sized particles which are then thoroughly distributed in the mix.

In general, the invention involves the incorporation of shortening in the form of substantially uniform sized particles into the previously blended dry ingredients of a prepared baking mix. This may be accomplished in any of a number of ways. The shortening may be shredded directly into the mixer in the form of shreds of substantially uniform cross-section, which readily break up in the mix and become thoroughly distributed. Another method involves the extruding of the shortening prior to mixing, into the form of relatively uniform particles. This should be done under conditions such as low temperature, such that the uniform particles do not tend to coalesce unduly and form large lumps. Another method involves the extrusion of the shortening directly into the mixer in the form of filaments or cylinders of uniform cross-section. These filaments or cylinders may be severed into small pieces before being incorporated in the mix or they may be broken up in the mix by means of a mixing action. A highly satisfactory manner of accomplishing this is to provide an extruder which discharges into the side of a ribbon mixer. As the shortening is extruded into the mixture, the ribbon agitator severs off small pieces, which become immediately coated with the dry ingredients and the individual pieces do not tend to coalesce. It is a simple matter then to break these small pieces down to a suitable size.

*Example No. 1.—Corn muffin mix*

Into a ribbon-type mixer the following ingredients were placed and blended for five minutes.

| | Pounds |
|---|---|
| Hard wheat flour | 100 |
| Corn meal | 80 |
| Sugar | 40 |
| Salt | 6 |
| Baking powder | 5 |

The shortening, in the amount of approximately 50 lbs., was introduced into the mixer through a 9-inch cylindrical press having a die with ¼" diameter holes therein. This press was attached at right angles to the mixer sides about half way down so that the shreds of shortening were extruded directly into the moving stream of dry ingredients and were broken off either by the ingredients themselves or by the ribbon mixer. The extrusion required approximately 1 minute and the entire mix was then blended for an additional two to five minutes.

*Example No. 2.—Cake mix*

This mix was prepared in an apparatus similar to that described in Example 1, but with a die having $\tfrac{3}{16}$" diameter holes and from the following ingredients:

| | Pounds |
|---|---|
| Cake flour | 70 |
| Sugar | 80 |
| Baking powder | 2 |
| Salt | 2 |
| Powdered milk | 7 |
| Spice blend | 2 |

After these ingredients were blended, the 30 lbs. of shortening were extruded directly through the side of the mixer into the stream of dry ingredients. Mixing time for blending shortening was 3 to 8 minutes depending upon the hardness of the shortening.

*Example No. 3.—Gingerbread mix*

| | Pounds |
|---|---|
| Flour | 100 |
| Dried molasses | 20 |
| Sugar | 40 |
| Powdered milk | 8 |
| Powdered egg | 1 |
| Baking powder | 3 |
| Spice blend | 2 |
| Salt | 2 |

The above ingredients were blended in the ribbon mixer described in Example 1, and 25 lbs. of shortening were extruded through a $\frac{3}{16}''$ die into the side of the mixer directly into the flowing stream of dry ingredients. Mixing time was 3 to 5 minutes.

*Example No. 4.—Pie crust mix*

| | Pounds |
|---|---|
| Flour | 200 |
| Salt | 10 |

These ingredients were blended and 60 lbs. of shortening were extruded through a $\frac{1}{2}''$ die directly into the moving stream of dry flour. Mixing time was 1 to 3 minutes.

*Example No. 5.—Prepared biscuit flour*

| | Pounds |
|---|---|
| Flour | 82 |
| Sugar | 4 |
| Powdered skim milk | 2 |
| Salt | 2 |
| Baking powder | 3 |

These ingredients were blended and 7 lbs. of shortening were extruded into the mix in the form of 2-inch cubes. Mixing was continued for approximately 5 minutes.

*Example No. 6.—Cake mix*

The same ingredients in the same proportions as set forth in Example 2 were employed in this example. The shortening was previously extruded through a $\frac{1}{16}''$ die and had been stored under refrigeration in this form. Thirty pounds of this extruded shortening were mixed with the previously blended ingredients for a period of about 5 minutes to thoroughly incorporate the shortening into the mix.

While in the specific examples, we have disclosed that various sized particles may be employed, it is desired to point out that other sized particles may be substituted. Thus, for example, any particles ranging from $\frac{1}{8}''$ to $2''$ in any dimension have been found suitable for this purpose. Likewise it is desired to point out that other specific methods of producing these uniformly shaped shortening particles may be employed in place of the specific methods heretofore described.

While various modifications of the invention have been described, it is to be understood that the same is not limited thereto, but may be varied within the scope of the following claims.

We claim as our invention:

1. Process of making a prepared baking mix containing finely divided cereal material and solid shortening which comprises subdividing the shortening into relatively small particles of substantially uniform size at least two dimensions of which are in the range of $\frac{1}{8}$ to $\frac{1}{2}$ inch, incorporating the relatively small particles in the finely divided cereal material, and further reducing the relatively small particles in size while admixed with the finely divided cereal material.

2. Process of making a prepared baking mix containing a finely divided cereal material and solid shortening which comprises extruding the shortening into strands of relatively uniform cross-section the dimensions of which are in the approximate range of $\frac{1}{8}$ to $\frac{1}{2}$ inch, severing the strands into relatively small particles, incorporating the relatively small particles in the finely divided cereal material, and further reducing the relatively small particles in size while admixed with the finely divided cereal material.

3. Process of making a prepared baking mix containing a finely divided cereal material and solid shortening which comprises agitating the finely divided cereal material, extruding the shortening in the form of strands of relatively uniform cross-section the dimensions of which are in the approximate range of $\frac{1}{8}$ to $\frac{1}{2}$ inch into the cereal material in the mixer and thoroughly mixing the shortening and the cereal material.

4. Process of making a prepared baking mix containing a finely divided cereal material and solid shortening which comprises agitating the finely divided cereal material, extruding the shortening in the form of strands of relatively uniform cross-section the dimensions of which are in the approximate range of $\frac{1}{8}$ to $\frac{1}{2}$ inch into the cereal material in the mixer and thoroughly mixing the shortening and the cereal material for a period of time not substantially in excess of ten minutes.

5. Process of making a prepared baking mix containing a finely divided cereal material and solid shortening, which comprises extruding the shortening into strands of relatively uniform cross-section, the dimensions of which are not in excess of $\frac{1}{4}$ inch, severing the strands into relatively small particles, incorporating the relatively small particles in the finely divided cereal material, and further reducing the relatively small particles in size while admixed with the finely divided cereal material.

PAUL W. SALO.
LOUIS J. HUBER.

REFERENCES CITED

The following references are of record in the file of this patent:

UNITED STATES PATENTS

| Number | Name | Date |
|---|---|---|
| 1,103,355 | Fabel | July 14, 1914 |
| 1,117,012 | Estabrook | Nov. 10, 1914 |
| 1,119,260 | Estabrook | Dec. 1, 1914 |
| 1,326,276 | Kohman | Dec. 30, 1919 |
| 1,474,773 | Fraser | Nov. 20, 1923 |
| 1,516,968 | Johnson | Nov. 25, 1924 |
| 2,124,744 | Meakin | July 26, 1938 |
| 2,324,432 | Gallo | Mar. 11, 1941 |

OTHER REFERENCES

Berolzheimer: Am. Woman's Cook Book, Consolidated Book Publishers, Chicago (1945), page 586.

Halliday et al.: Hows and Whys of Cooking, U. of Chicago Press, 3 ed., 1946, page 163.

Newill: Good Food, D. Appleton-Century Company, N. Y. (1939), page 377.